July 15, 1952   L. B. BROWN   2,603,268
REMOVABLE TRACTION CLEAT FOR USE WITH VEHICLE TIRES
Filed April 10, 1951
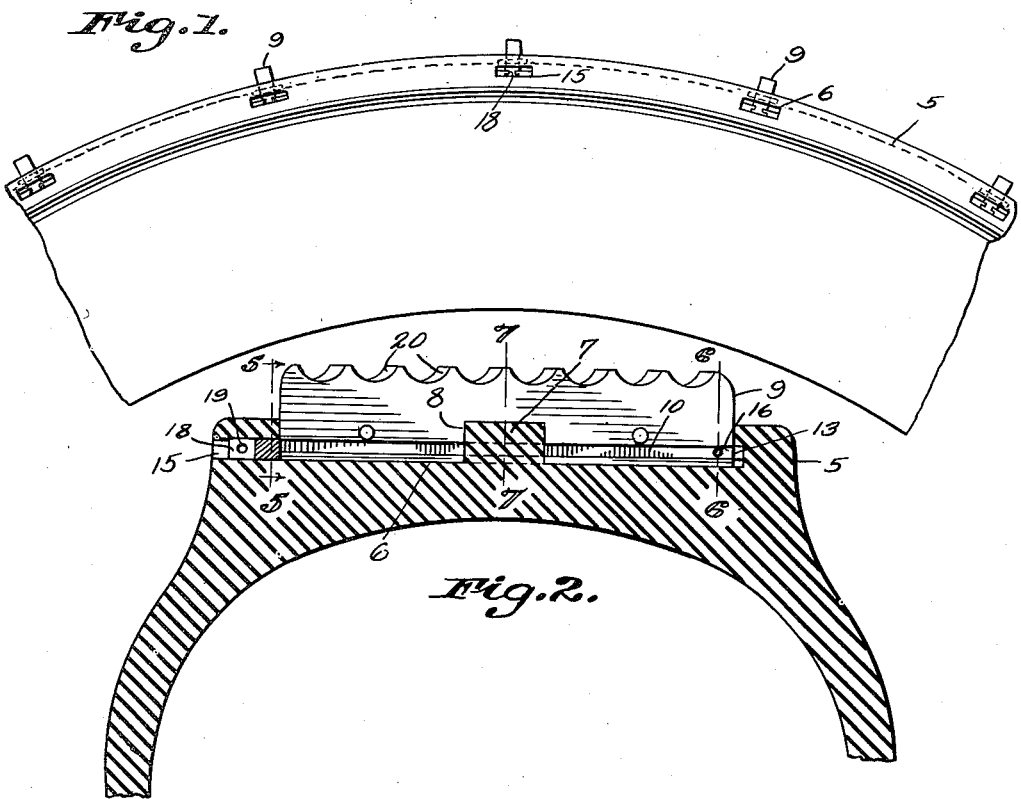
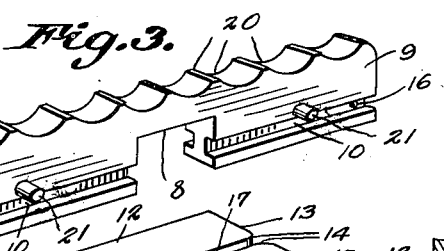
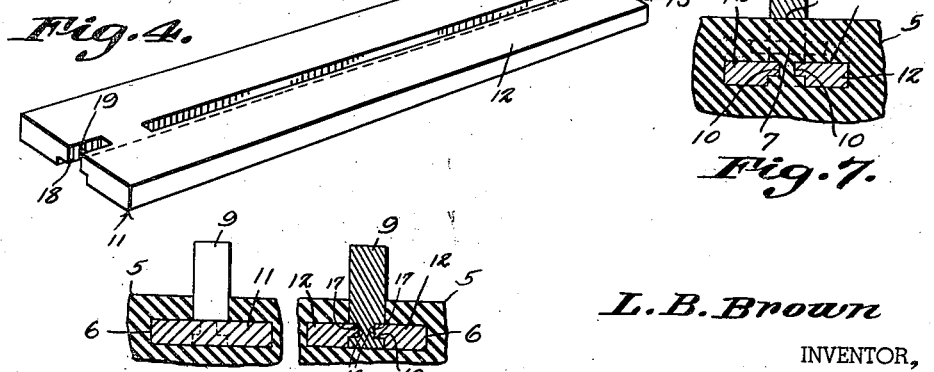
L. B. Brown
INVENTOR,
BY C. A. Snow & Co.
ATTORNEYS.

Patented July 15, 1952

2,603,268

UNITED STATES PATENT OFFICE 2,603,268

REMOVABLE TRACTION CLEAT FOR USE WITH VEHICLE TIRES

Louis B. Brown, Duquesne, Pa.

Application April 10, 1951, Serial No. 220,259

5 Claims. (Cl. 152—210)

This invention relates to pneumatic tire construction, the primary object of the invention being to provide a tire wherein the tread thereof is provided with removable tread cleats, means being provided for securing the cleats to the tire tread to permit ready and easy mounting or removal of said cleats.

An important object of the invention is to provide removable traction cleats of a construction to closely fit within transversely disposed openings formed in the tread of a pneumatic tire, and slidable gates of a construction to cooperate with said cleats in securing the cleats against displacement under severe strains directed thereto.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Figure 1 is a fragmental side elevational view of a pneumatic tire constructed in accordance with the invention.

Fig. 2 is an enlarged transverse fragmental sectional view illustrating a removable traction cleat positioned in a groove formed in the tire tread.

Fig. 3 is a perspective view illustrating one of the removable traction cleats.

Fig. 4 is a perspective view of a key used in securing a traction cleat in place.

Fig. 5 is a sectional view taken on line 5—5 of Fig. 2.

Fig. 6 is a sectional view taken on line 6—6 of Fig. 2.

Fig. 7 is a sectional view taken on line 7—7 of Fig. 2.

Referring to the drawing in detail, the reference character 5 indicates the tread section of a pneumatic vehicle tire, the tread section being provided with transversely disposed slots 6, which are substantially wide at their bottoms providing key-ways. These slots 6 are of lengths to extend across the tread section 5, the ends of the slots terminating in spaced relation with the side edges of the tread 5, as clearly shown by Fig. 2 of the drawing. These slots 6 are so constructed that central enlargements 7 are provided, the enlargements 7 dividing the slots into lateral sections and at the same time providing stops to extend into the recesses or cut-out portions 8 formed intermediate the ends of the traction cleats 9, the cut-out portions 8 extending inwardly from the inner edges of the cleats.

It might be stated that the recesses are of depths to permit the cleats 9 to fit within said slots 6 so that substantial portions of the cleats extend beyond the tread surface of the tire to insure ample traction surfaces for contact with the ground.

Formed in the longitudinal side edges of the traction cleats 9 adjacent to the inner edges of the cleats, are grooves 10, which grooves are designed to accommodate the keys 11, which keys provide spaced members 12 that have their ends 13 formed with rounded corners 14 adapted to guide the keys into the grooves 10 when inserting a key to lock or secure the traction cleats against displacement. Disposed in alignment with the slots 6, are key openings 15 in which keys 11 are positioned and guided to the grooves 10 for holding the cleats against displacement.

Depressions 16 are formed in the inner surfaces of the grooves 10 at opposite sides of the traction cleats, which depressions are of sizes to receive the lugs 17 formed on the inner edges of the keys, it being understood that these lugs will move into the depressions as the keys are inserted in the grooves, thereby holding the keys against accidental displacement. A cut-out portion indicated by the reference character 18 is formed in one end of the key and one wall of said cut-out portion is provided with the opening 19, which is designed to receive the end of a key removing tool, which may be in the form of a heavy wire capable of being extended into the cut-out portion and fitted in the opening 19 to pull the key from its position when it is desired to remove the keys to remove the traction cleats.

Pins 21 are formed integral with the cleats 9 and extend laterally therefrom, the pins being adapted to fit within the usual angular grooves of a tire tread, thereby providing means for further bracing the cleats against lateral movement within their grooves, under lateral strains directed thereto.

These traction cleats may have their tread surfaces constructed in any desirable manner, without departing from the spirit of the invention. However, in the form of the invention as shown, the treads of the traction cleats are formed with scallops 20.

From the foregoing it will be seen that due to the construction shown and described, these traction cleats may be readily and easily removed or replaced, as desired, the slots in the tread of the tire being closed by means of a filler member not shown, and which may be constructed of any desirable material, to prevent dirt or other foreign matter from entering the slots when the slots are not equipped with the traction cleats.

Having thus described the invention, what is claimed is:

1. A vehicle tire having a plurality of spaced transversely disposed slots formed in the tread thereof, one of the respective ends of each slot terminating in a key opening extending to the outer edge of the tire, traction cleats fitted within said slots, and keys extending into the key openings and slots, gripping said cleats, holding said cleats against accidental displacement.

2. A vehicle tire having a plurality of spaced transversely disposed slots formed in the tread thereof, one of the respective ends of each slot terminating in a key opening extending to the outer edge of the tire, traction cleats disposed within said slots, said cleats having longitudinally disposed grooves formed adjacent to the inner edges thereof, said grooves aligning with said key openings, and keys extending through the key openings and longitudinal grooves of the cleats, securing the cleats against accidental displacement.

3. A vehicle tire having a plurality of spaced transversely disposed slots formed in the tread thereof, one of the respective ends of each slot terminating in a key opening extending to the outer edge of the tire, enlargements formed intermediate the ends of the slots and rising therefrom, traction cleats having recesses formed intermediate the ends thereof fitted over said enlargements, securing said cleats against movement longitudinally of the slots, said cleats having grooves formed longitudinally thereof and disposed adjacent to the inner longitudinal edges of the cleats, and keys positioned in the key openings and grooves of the cleats, holding said cleats against accidental displacement within the slots.

4. A vehicle tire having a plurality of spaced transversely disposed slots formed in the tread thereof, said slots being wide at the bottoms thereof providing key-ways, one of the respective ends of each slot extending to a point flush with the outer surface of the tire providing key-openings, traction cleats positioned within the slots, said cleats having grooves formed longitudinally thereof, and keys extending through the key openings, and grooves removably securing the traction cleats within said slots against accidental displacement.

5. A vehicle tire having a plurality of spaced transversely disposed slots formed in the tread thereof, one of the respective ends of each slot terminating in a key opening extending to the outer edge of the tire, traction cleats fitted within said slots, said cleats having grooves formed in the outer surfaces thereof adjacent to the inner longitudinal edges of the cleats, forked keys adapted to be extended into the key openings straddling the cleats, said keys being movable into the grooves of the cleats, and said keys adapted to secure the traction cleats against accidental displacement.

LOUIS B. BROWN.

REFERENCES CITED

The following references are of record in the file of this patent:

UNITED STATES PATENTS

| Number | Name | Date |
| --- | --- | --- |
| 1,265,556 | Varner | May 7, 1918 |
| 2,121,740 | Kraft | June 21, 1938 |
| 2,480,548 | Carhart | Aug. 30, 1949 |